United States Patent [19]

Schenk

[11] 4,206,244
[45] Jun. 3, 1980

[54] DRY MIX FOR PREPARING A CARBONATED YOGURT

[75] Inventor: Roy U. Schenk, Madison, Wis.

[73] Assignee: Persian Delight, Inc., Santa Barbara, Calif.

[21] Appl. No.: 875,430

[22] Filed: Feb. 6, 1978

[51] Int. Cl.² .......................... A23C 9/10; A23C 11/00
[52] U.S. Cl. ..................................... 426/583; 426/588
[58] Field of Search ................. 426/43, 583, 588, 551, 426/554

[56] References Cited

U.S. PATENT DOCUMENTS

| | | | |
|---|---|---|---|
| 3,080,236 | 3/1963 | Ferguson Jr. | 426/588 X |
| 4,066,794 | 1/1978 | Schur | 426/43 X |

FOREIGN PATENT DOCUMENTS 45-40259 12/1970 Japan .

OTHER PUBLICATIONS

Webb, et al., By Products from Milk, 2nd Ed. The Avi Publ. Co., Inc., Westport, Conn. 1970 (pp. 36 & 37).
Chemicals Used In Food Processing Publication 1274, National Academy of Sciences, Washington, D.C. (p. 42) 1965.

*Primary Examiner*—David M. Naff
*Attorney, Agent, or Firm*—Lyon & Lyon

[57] ABSTRACT

A dry mix for combining with water to make a carbonated liquid yogurt is prepared containing powdered yogurt, an edible, solid acid and a solid metal carbonate. A preferred metal carbonate is a mixture of sodium bicarbonate and calcium carbonate. The mix may also contain an edible, water insoluble opacifier.

22 Claims, No Drawings

DRY MIX FOR PREPARING A CARBONATED YOGURT

BACKGROUND OF THE INVENTION

Yogurt is a fermented, slightly acidic, semi-solid food made of whole and skimmed milk and milk solids to which cultures of bacteria have been added. The milk can be cow's milk, goats milk, or milk from other mammals. Bacteria commonly used for producing yogurt are *Lactobacillus bulgaricus* and *Streptococcus themophilus*. Instead of preparing yogurt with bacteria cultures, methods have been developed for preparation of yogurt by chemical acidification, as described in U.S. Pat. No. 3,432,306, issued to Joseph R. Edwards. The term "yogurt" as used herein refers to both cultured and acidified yogurts.

Yogurt products require refrigeration to prevent degradation of product quality and spoiling. Such refrigeration is expensive, both for the producer of yogurt and for the retailer, and adds to the cost of commercial products. In addition, even with such refrigeration, yogurt products have a limited shelf-life.

Another problem with yogurt products is that they are bulky because of the high water content, and are inconvenient to carry outside of the home such as on camping trips, backpacking, and the like.

Therefore, there is a need for a yogurt food product which does not require refrigeration, which is tasty, and which can be conveniently used outside of the home.

SUMMARY OF THE INVENTION

Therefore, there is provided according to the present invention a mix for preparing a carbonated liquid yogurt, the carbonation giving the product an excellent taste. The mix comprises powdered yogurt and sufficient edible, solid, at least partially water-soluble acid to produce a liquid yogurt having a pH of less than 7 when the mix is combined with water. The milk also comprises sufficient metal carbonate selected from the group consisting of edible, solid, at least partially water-soluble alkali metal carbonates and bicarbonates; edible, solid, at least partially water-soluble alkaline earth metal carbonates and bicarbonates; and mixtures thereof, to produce a carbonated liquid yogurt when the mix is combined with water.

Preferably, the acid is an organic acid such as citric acid and the mix contains from about 0.2 to about 0.4 pbw (parts by weight) of the acid per 1 pbw powdered yogurt. The preferred metal carbonates are sodium bicarbonate and calcium carbonate and preferably the mix contains from about 0.05 to about 0.25 pbw metal carbonate per 1 pbw powdered yogurt.

The mix can also contain an opacifier such as calcium lactate or calcium biphosphate, sweetener, and powdered whole milk.

These and other features, aspects and advantages of the present invention will be better understood with reference to the appended claims and following description.

DESCRIPTION OF THE INVENTION

A substantially dry mix for preparing a carbonated liquid yogurt comprises powdered yogurt; edible, solid, at least partially water-soluble acid; and metal carbonate selected from a group consisting of edible, solid, at least partially water-soluble alkali metal carbonates and bicarbonates; edible, solid, at least partially water soluble alkaline earth metal carbonates and bicarbonates; and mixtures thereof.

The powdered yogurt is prepared by dehydrating a conventionally prepared yogurt product. This can be either from cultured or acidified yogurt. Such powders are available commercially. For example, Beatrice Foods manufactures a powdered yogurt under the trade name Beatrene 3315.

A problem with powdered yogurts is when they are mixed with water, the resultant product has a taste which is not as good as the original yogurt product. Therefore, to produce a yogurt product with a satisfactory taste, sufficient metal carbonate is mixed with the powdered yogurt to produce a carbonated liquid yogurt when the mix is combined with water. However, the presence of the metal carbonate partially neutralizes the natural acidity of the powdered yogurt. Therefore, sufficient acid is included in the mix to produce a liquid yogurt having a pH less than 7 when the mix is combined with water.

The acid used is at least partially water-soluble, preferably totally soluble in water, so that when the mix is combined with water, the acid dissolves. Also, preferably the acid is solid for ease of packaging and to avoid premature reaction with the metal carbonate in the mix. As used herein, the term "solid" means solid at room temperature.

The preferred acids are organic acids such as citric acid and tartaric acid. Citric acid is the most preferred acid because it is inexpensive and approved for food use. It is desirable to include stearic acid in the mix because it adds a rich taste to the yogurt product. This occurs because stearic acid gives a "fatty" taste to the product. Ascorbic acid can be added to the mix in an amount of about 100 milligrams per 8 ounce serving to raise the vitamin C content of the mix and in the case of citrus flavored mixes, improve taste.

Sufficient acid is included in the mix so that liquid yogurt prepared from the mix has a pH less than 7, and preferably has a pH of about 5 or lower. The powdered yogurt by itself when dissolved in water has a pH of about 4.75. It has been found that to obtain a satisfactory acidic taste in the product, the mix should contain from about 0.2 to about 0.4 pbw of acid, and preferably about 0.3 pbw of acid per 1 pbw of powdered yogurt.

Exemplary of suitable metal carbonates are calcium carbonate, calcium bicarbonate, sodium carbonate, sodium bicarbonate, and dolomite powder. Preferably the metal carbonates used are sodium bicarbonate and calcium carbonate in combination. It is desirable to include sodium bicarbonate in the mix because it dissolves quickly in water, and thereby quickly releases carbon dioxide. Thus almost immediately after combining the yogurt mix with water, a carbonated beverage is produced.

It is desirable to include calcium carbonate in the mix because it dissolves slower than sodium bicarbonate, and thus carbonates the liquid yogurt produced by mixing the powder with water for a long period of time. Thus, the carbonated beverage does not quickly go flat upon standing.

A further advantage of including calcium carbonate and other calcium compounds in the mix is that the calcium reacts with the acid present to form a substantially water insoluble salt such as calcium citrate and calcium lactate. These salts add opacity to the liquid product prepared from the mix.

If less than about 0.05 pbw of metal carbonate per 1 pbw powdered yogurt is used in the mix, insufficient carbonation results. If more than about 0.25 pbw of metal carbonate is used per 1 pbw powdered yogurt, then the liquid yogurt produced from the mix has an unsatisfactory alkaline and salty taste.

Therefore, it is preferred that the mix contain from about 0.05 to about 0.25 pbw metal carbonate. More preferably the mix contains from about 0.1 to about 0.2 pbw metal carbonate per 1 pbw powdered yogurt for satisfactory carbonation and optimum taste. In these weight ratio ranges, it is preferred that the weight ratio of sodium bicarbonate to calcium carbonate in the mix be from about 0.5:1 to about 2:1, and more preferably the mix contains from about 1 to about 1.5 pbw sodium carbonate per 1 pbw calcium carbonate to obtain fast and long lasting carbonation of the liquid yogurt.

A variety of other ingredients can be added to the dry mix such as milk solids, opacifiers, flavorants, sweeteners, stabilizers, colorants, and fillers.

Milk solids which can be added to the mix include powdered whole milk and powdered non-fat milk. Preferably powdered whole milk is used to add richness to the product. It is found that adding about 0.1 pbw powdered whole mix per 1 pbw yogurt powder adds richness to the liquid yogurt produced from the mix without unduly increasing its cost.

To increase the opacity of the liquid product produced from the mix, edible calcium salts can be included in the mix. Exemplary of suitable calcium solids are calcium phosphate, dibasic ($CaHPO_4$), calcium lactate, and calcium citrate. An advantage of including calcium lactate in the mix is that it gives the liquid product produced from the mix a lactic acid taste. Since yogurt includes lactic acid, calcium lactate makes the liquid product produced from the mix better tasting because it tastes more like natural, undehydrated yogurt. When the liquid mix includes calcium lactate, preferably the mix contains about 0.06 pbw calcium lactate per 1 pbw yogurt powder.

Sweetener can be added to the dry mix to add bulk to the mix and for taste. Suitable sweeteners include glucose, fructose, dry molasses solids, dry honey solids, sucrose, or a combination of these sweeteners. For taste purposes, preferably, the mix contains at least about 1 pbw sweetener, and up to about 1.2 pbw sweetener per 1 pbw yogurt powder.

The food product can contain an edible stabilizer to prevent separation of the solid portions of the mix when the mix is combined with water. Preferably, the product contains sufficient stabilizer that substantially no visible separation of the yogurt and the water occurs in at least one hour after combining the mix with water. Any known solid edible stabilizer or mixture of stabilizers can be utilized in the food products. Stabilizers which can be used include gelatin, sodium caseinate, water dispersible proteins, flour, tapioca flour and other hydrophilic colloids, starch including corn starch and modified starch, agar, Irish moss extract, algin, locust bean gum, guar gum, cellulose gums such as carboxymethyl cellulose and hydroxy propyl, methyl cellulose and methyl cellulose gum, tragacanth, gum arabic, tapioca starch, pectin, corn flour, simple emulsified fats, lecithin, and mixtures thereof.

Fillers can be added to the mix to increase the bulk of the mix and decrease the cost of the mix. A particularly suitable filler is dextran.

Food grade colorants can be added to the product so that the product has a color corresponding to the flavorant added.

The ingredients of the mix can be combined in conventional mixing equipment. Preferably this is done at low humidity so that the mix has a low moisture content. If too much moisture is absorbed by the mix, the acid and the metal carbonate in the mix can react in storage, thereby ruining the product.

These and other features of the present invention will become better understood with reference to the following examples.

EXAMPLES 1–18

Table 1 presents the compositions of 18 different dry yogurt mixtures produced. With the exception of Example 1, each mix was formulated so that a delicious carbonated liquid yogurt can be prepared by combining 30 grams of the mix with 8 ounces of water. It was found that the mix of Example 18 gave the best tasting product, particularly when made with a raspberry flavorant.

A few of the ingredients listed in Table 1 need additional description. "Staleydex" corn sugar is the trade name for glucose sold by Staley Manufacturing Company, Decatur, Ill. "FRO-DEX 10" is a dextran filler sold by American Maize Products of Hammond, Indiana. Jaguar CMHPG is a modified guar gum sold by Stein, Hall, and Company., Inc., of New York, New York. Keltrol is a gum derived from kelp manufactured by Kalco Company of Clark, New Jersey.

As indicated in Table 1, a variety of flavorants were used. The most satisfactory tasting liquid products were obtained using raspberry, strawberry, and lemon flavorants. The raspberry flavorants used were Permaseal Artificial Raspberry Flavor F-2827-S and Artificial Raspberry Flavor SD-V-18-274 manufactured by Givaudan Corporation of Clifton, New Jersey. The strawberry flavorant used as Permaseal Artificial Strawberry Flavor F-5930-A manufactured by Givaudan Corporation. The lemon flavorant used was IFF Sealva Lemon Flavor V-5137 manufactured by International Flavoring and Fragrance, Inc. of Teterboro, New Jersey.

Satisfactory orange and pineapple flavor products were produced, although they did not taste as good as the raspberry, lemon and strawberry products. The flavoring used for orange tasting products was provided by Ungerer Company of New York, New York, their catalog number Flavolope Orange 4702. The pineapple flavorant tested was Permaseal Artificial Pineapple Flavor F-4966-S from Givaudan Corporation. Another pineapple flavorant tested was provided by International Flavoring and Fragrance, Inc., their catalog number IFF V12 197.

The mix of the present invention has significant advantages over conventional yogurt products. Compared to undehydrated yogurt, the mix has the advantages of low bulk and room temperature stability. Therefore, it can easily be used and sold in out of the way places. Compared to yogurt powder, the liquid product prepared from the mix has a taste which is superior to the taste of the liquid product prepared from plain yogurt powder.

Although this invention has been described in terms of certain preferred versions thereof, other versions of the mix can be formulated within the guidelines presented above. For example, additives including sweetening enhancers such as mono-ammonium glycyrrhizinate ($C_{42}H_{61}O_{16}NH_4$) can be included in the mix. Therefore, because of variations such as this, the spirit and scope of the appended claims should not necessarily be limited to the description of the preferred versions contained herein.

9. The mix of claim 8 in which the opacifier is selected from the group consisting of calcium lactate, calcium biphosphate, and mixtures thereof.

10. The mix of claim 9 comprising about 0.06 part by weight calcium lactate per one part by weight powdered yogurt.

TABLE 1

| COMPONENT | (% by weight of total solids) EXAMPLE | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Yogurt Powder 3315 Beatrene | 67.6 | 36.2 | 36.2 | 36.2 | 35.7 | 35.7 | 35.7 | 31.7 | 32.2 | 33.3 | 33.5 | 33.5 | 32.0 | 33.0 | 33.5 | 33.3 | 33.5 | 33.8 |
| citric Acid | 20.3 | 10.9 | 10.9 | 10.9 | 10.7 | 10.7 | 10.7 | 11.1 | 12.1 | 10.0 | 10.0 | 10.0 | 9.6 | 9.8 | 10.0 | 10.0 | 10.0 | 10.2 |
| $NaHCO_3$ | 6.8 | 3.6 | 3.6 | 3.6 | 3.6 | 3.6 | 3.6 | 3.2 | 4.1 | 4.0 | 4.1 | 4.1 | 3.8 | 3.8 | 3.9 | 3.8 | 3.9 | 5.4 |
| Dolomite Pwdr. | | 3.6 | | 3.6 | | | | | | | | | | | | | | |
| Ppted. Chalk | | | | | 3.6 | 3.6 | 3.6 | 3.2 | 2.8 | 2.7 | 2.8 | 2.8 | 2.7 | 2.7 | 2.7 | 2.7 | 2.7 | 1.4 |
| $CaHPO_4$ | | | 3.6 | | | | | | | | | | | | | | | |
| Staleydex Corn Sugar | | 42.9 | | 21.4 | 21.4 | 42.9 | | 19.0 | 40.5 | 20.0 | 40.0 | 40.0 | 38.5 | 40.0 | 40.2 | 40.0 | 40.2 | 37.2 |
| FRO-DEX 10 | | | 42.9 | 21.4 | 21.4 | | 42.9 | 19.0 | | 20.0 | | | | | | | | |
| Stearic Acid | | | | 0.4 | | | | | | | | | | | | | | |
| Calcium Lactate | | | | | 0.7 | 0.7 | 0.7 | 6.3 | | 1.3 | 2.1 | 2.1 | 1.9 | 1.9 | 2.0 | 2.0 | 2.0 | 2.0 |
| Jaguar CMHPG | 5.4 | 2.9 | 2.9 | 2.9 | 2.9 | 2.9 | 2.9 | | | 6.7 | | | | | | | | |
| Carboxymethyl Cellulose | | | | | | | | 6.3 | | | | | | | | | | |
| Hydroxy Propyl Methyl Cellulose | | | | | | | | | 8.3 | | | | | | | | | |
| Keltrol | | | | | | | | | | | 1.4 | 1.4 | 1.3 | 1.3 | 1.3 | 1.3 | 1.3 | 3.4 |
| Ascorbic Acid | | | | | | | | | | | | | 2.9 | 0.3 | | 0.3 | | |
| Powdered Milk Whole | | | | | | | | | | 2.0 | 3.4 | 3.4 | 3.2 | 3.2 | 3.3 | 3.3 | 3.3 | 3.4 |
| * | | | | | | | | | | | P | S | L | O | R | L | R | |
| Flavor | | | | | | | | | | | 3.3 | 3.3 | 2.9 | 3.0 | 3.0 | 3.3 | 3.3 | 3.2 |

*P—peach, S—strawberry, L—lemon, O—orange, R—raspberry

I claim:

1. A substantially dry mix for preparing a carbonated liquid yogurt comprising:
   (a) powdered yogurt;
   (b) sufficient edible, solid, at least partially water-soluble acid to produce a liquid yogurt having a pH of less than 7 when the mix is combined with water; and
   (c) sufficient solid metal carbonate in an amount from about 0.05 to about 0.25 by weight metal carbonate per one part by weight powdered yogurt to produce a carbonated liquid by solution of the metal carbonate in water when the mix is combined with water, wherein the solid carbonate is a mixture of a bicarbonate that dissolves quickly in water and quickly releases carbon dioxide and a carbonate that dissolves slowly in water and slowly releases carbon dioxide in a weight ratio of from about 0.5:1 to about 2:1.

2. The mix of claim 1 wherein the metal carbonate comprises sodium bicarbonate and calcium carbonate.

3. The mix of claim 1 in which metal carbonate in the mix consists essentially of sodium bicarbonate and calcium carbonate.

4. The mix of claims 2 or 3 in which the weight ratio of sodium bicarbonate to calcium carbonate is from about 0.5:1 to about 2:1.

5. The mix of claims 2 or 3 in which the weight ratio of sodium bicarbonate to calcium carbonate is from about 1:1 to about 1.5:1.

6. The mix of claim 1 comprising about 0.3 part by weight acid per one part by weight powdered yogurt.

7. The mix of claims 1 or 6 comprising from about 0.1 to about 0.2 part by weight metal carbonate per one part by weight powdered yogurt.

8. The mix of claim 1 comprising an edible, water-insoluble opacifier.

11. The mix of claim 1 including sweetener.

12. The mix of claim 11 comprising at least about one part by weight sweetener per one part by wt. powdered yogurt.

13. The mix of claim 12 comprising up to about 1.2 parts by weight sweetener per one part by weight powdered yogurt.

14. The mix of claim 1 comprising powdered whole milk.

15. The mix of claim 14 comprising about 0.1 part by weight whole milk per one part by weight powdered yogurt.

16. The mix of claim 1 in which the acid comprises citric acid.

17. A substantially dry mix for preparing a carbonated liquid yogurt mix comprising:
   (a) one part by weight powdered yogurt;
   (b) from about 0.2 to about 0.4 part by weight citric acid;
   (c) from about 0.1 to about 0.2 part by weight of sodium bicarbonate and calcium carbonate in a weight ratio of sodium bicarbonate to calcium carbonate of from about 0.5:1 to about 2:1,
   (d) at least one part by weight sweetener; and
   (e) calcium lactate.

18. The mix of claim 17 in which the weight ratio of sodium bicarbonate to calcium carbonate is from about 1:1 to about 1.5:1.

19. The mix of claim 17 comprising about 0.3 part by weight of citric acid per one part by weight powdered yogurt.

20. The mix of claim 17 comprising about 0.06 part by weight calcium lactate per one part by weight powdered yogurt.

21. The mix of claim 17 comprising up to about 1.2 parts by weight sweetener per one part by weight powdered yogurt.

22. The mix of claim 1 comprising from about 0.2 to about 0.4 part by weight acid per one part by weight powdered yogurt.